United States Patent [19]
DeSimone et al.

[11] Patent Number: 5,360,869
[45] Date of Patent: Nov. 1, 1994

[54] METHOD OF MAKING FLUORINATED COPOLYMERS

[75] Inventors: Joseph M. DeSimone; Michael O. Hunt, Jr., both of Chapel Hill, N.C.

[73] Assignee: University of North Carolina at Chapel Hill, Chapel Hill, N.C.

[21] Appl. No.: 972,045

[22] Filed: Nov. 5, 1992

Related U.S. Application Data

[63] Continuation-in-part of Ser. No. 969,876, Oct. 30, 1992, abandoned.

[51] Int. Cl.⁵ .............................................. C08F 8/00
[52] U.S. Cl. ................................. 525/102; 525/103; 525/105; 526/82
[58] Field of Search ............... 525/100, 102, 103, 105; 528/14, 25, 36, 42; 526/82

[56] References Cited

U.S. PATENT DOCUMENTS

| | | | |
|---|---|---|---|
| 3,692,874 | 9/1972 | Farrar et al. | 525/105 |
| 3,956,419 | 5/1976 | Murray | 526/82 |
| 4,992,521 | 2/1991 | Saho et al. | 528/14 |

FOREIGN PATENT DOCUMENTS

| | | |
|---|---|---|
| 353709 | 2/1990 | European Pat. Off. . |
| 378420 | 7/1990 | European Pat. Off. . |
| 394963 | 10/1990 | European Pat. Off. . |
| 2234703 | 1/1973 | Germany . |
| 3248535 | 7/1984 | Germany . |
| 58-172246 | 6/1983 | Japan . |
| 63135435 | 6/1986 | Japan . |
| 63-296002 | 12/1988 | Japan . |
| 03034988 | 2/1991 | Japan . |
| 03156468 | 7/1991 | Japan . |

*Primary Examiner*—Ralph H. Dean
*Attorney, Agent, or Firm*—Bell, Seltzer, Park & Gibson

[57] ABSTRACT

A process for making a fluorinated copolymer is disclosed. The process comprises polymerizing a monomer to form a polymer and then terminating the polymerization by adding a perfluorinated alkyl chlorosilane to the polymer. The perfluorinated alkyl chlorosilane reacts with the polymer to form a copolymer having a fluorinated terminal portion thereon.

15 Claims, No Drawings

METHOD OF MAKING FLUORINATED COPOLYMERS

RELATED APPLICATIONS

This application is a continuation-in-part application of copending U.S. patent application Ser. No.969,876, filed Oct. 30, 1992 for "Method of Making Fluorinated Copolymers" by Joseph M. DeSimone, et al., now abandoned.

FIELD OF THE INVENTION

The present invention relates to a method of making fluorinated copolymers, and specifically fluorinated copolymers having a fluorinated terminal segment thereon.

BACKGROUND OF THE INVENTION

Fluoropolymers have proven to be a very interesting and useful class of materials due to their unique properties. These properties include low surface energy, low coefficient of friction, low dielectric constant, solvent resistance, and chemical resistance. For example, fluoropolymers are used extensively as lubricants in computer disk drives, protective coatings, aircraft fuel sealants, and the like. However, due to these properties, fluoropolymers are inherently difficult and expensive to synthesize and process.

Von Au et al., German Patent No. 3248535 disclose the preparation of diorganopolysiloxane containing fluoroalkyl groups and uses for this polymer. Specifically, the patent reports the use of siloxanes containing (fluoroalkoxy)alkyl groups and fluoroalkyl groups as lubricants and antifoaming agents. The (fluoroalkoxy)alkyl and fluoroalkyl are added to sodium hydroxide to give OH-terminated siloxane. The siloxane is subsequently heated with dimethyl siloxane and poly(dichlorophosphazene) to give a clear oil.

Saho, et al., EPO 353709 report the preparation of siloxanes with amino and fluoroalkyl or pentafluorophenyl terminal groups, which are useful as antifouling agents and waterproofing for resins. In this patent the dimethyl hydroxyl silane $C_6F_{13}CH_2CH_2Si(Me)_2OH$ is reacted with hexamethylcyclotrisiloxane, butyl lithium, $Me_2SiHCl$ and N-(trimethylsiyl)allylamine in the presence of a platinum catalyst.

SUMMARY OF THE INVENTION

The present invention provides a method for making fluorinated polymers, specifically copolymers having a fluorinated terminal segment. In the process of the present invention, a monomer is polymerized to form a polymer. To provide the fluorinated copolymers of the invention, the polymerization is terminated by adding a terminating agent, preferably a perfluorinated alkyl chlorosilane, to the polymer. The terminating agent reacts with the polymer to form a copolymer having a fluorinated terminal segment thereon.

Preferably, the polymerization is an anionic polymerization carried out in the presence of an anionic catalyst. Any of a variety of monomers which may be polymerized using anionic techniques can be used, such as vinyl, diene, and siloxane monomers.

Following the present invention, a polymer may be prepared that includes fluorine to provide the desirable properties exhibited by fluoropolymers. For example, the fluorinated copolymers of the present invention may be used in compositions, for example, to alter surface tension properties, e.g., to create low energy surfaces such as for stain resistance properties.

DETAILED DESCRIPTION OF THE INVENTION

In the present invention, fluorinated polymers are provided by synthesizing copolymers having a fluorinated terminal component or segment thereon. The process of the invention comprises polymerizing a monomer to form a polymer and then terminating the polymerization by adding a fluorinated terminating agent, described in more detail below, to the polymer.

Preferably, the monomer is polymerized using living anionic polymerization techniques. As will be appreciated by those skilled in the art, anionic polymerizations involve a chain reaction pathway requiring the use of an anionic initiator, such as a Lewis base. Exemplary initiators in accordance with the present invention include but are not limited to organo alkalies such as butyl sodium and butyl lithium. A preferred initiator is sec-butyllithium. The polymerization initiators are used in the amounts conventionally employed for polymerization. For example, the initiator may be used in an amount of about 0.0001 to 10, preferably 0.0001 to 5, parts by weight per 100 parts by weight monomer.

The anionic polymerization reaction involves the nucleophilic addition of the initiator anion to a monomer. The monomer to be polymerized may be any of the monomers known in the art which may be polymerized using living anionic techniques. Such monomers include olefins, including vinyl monomers such as styrene, alkyl methacrylates, such as methyl methacrylate and the like, acrylonitrile, and 2-vinyl pyridine; and 1,3-dienes (diolefins) such as isoprene and butadiene. Other exemplary monomers include siloxanes, such as hexamethylcyclotrisiloxane, as well as other cyclic compounds such as ethylene oxide, and the like.

To provide the fluorinated copolymers of the present invention, the anionic polymerization is terminated by adding a terminating agent having a fluorine constituent to the polymerization product. Preferably, the terminating agent is a perfluorinated alkyl chlorosilane. As will be appreciated by the skilled artisan, silanes may be generally described as a silicon and hydrogen compound typically having the formula $Si_nH_{2n+2}$, and are analogous to alkanes or saturated hydrocarbons. The term "chlorosilane" as used herein refers to compounds in which at least one hydrogen has been substituted by a chlorine atom. In the perfluorinated alkyl chlorosilanes used in accordance with the present invention, the silane is also substituted at one hydrogen by a C1 to C40 fluorinated alkyl group. The C1 to C40 fluorinated alkyl group includes a linear or branched C1 to C30 perfluorinated alkyl. The term "perfluorinated" as used herein means that all or essentially all hydrogen atoms on an organic group are replaced with fluorine. In addition, advantageously at least one or both of the remaining hydrogens of the silane is substituted by an alkyl group, preferably lower alkyl group, such as methyl, ethyl, propyl, isopropyl, butyl, or isobutyl; C6 to C8 aryl, such as phenyl, tolyl and xylyl; alkoxy groups such as methoxy and ethoxy; halogen; siloxyl; alkylsiloxy such as dimethylsiloxy and trimethylsiloxy; and the like.

Such perfluorinated alkyl chlorosilanes are commercially available. The perfluorinated alkyl chlorosilanes may also be prepared following the elimination reaction set forth by N. Brace, *J. Org. Chem.* 1984, 49, 2366, followed by the hydrosilylation reaction described by J. Bommelaer, *Journal of Fluorine Chemistry* 1991, 55, 79 and A. Haas, *Journal of Fluorine Chemistry* 1981, 17, 531. Preferably, in the present invention, the terminating agent is a perfluorinated alkyl chlorosilane of the formula:

wherein:

$R^1$ and $R^2$ are independently hydrogen, linear or branched lower alkyl C1 to C4, or C6 to C8 aryl;

$R^3$ is linear or branched C1 to C10 or absent; and

Y is C1 to C30 perfluoroalkyl. In a preferred embodiment, $R^1$ and $R^2$ are each methyl, $R^3$ is ethyl, and Y is perfluorohexyl. An exemplary chlorosilane used in accordance with the invention is perfluorohexylethyldimethylchlorosilane.

Although the inventors do not wish to be bound by an explanation of the present invention, it is believed that the perfluorinated alkyl chlorosilane terminates the anionic polymerization via nucleophilic substitution of the fluorinated alkyl chlorosilane by the polymer carbanion. A copolymer is thereby formed having at least one segment comprising the product of the anionic polymerization and at least another fluorinated terminal segment. Thus, the present invention provides a method for preparing copolymers having desirable fluorine-containing segments without the problems and expense typically associated with preparing fluorinated polymers.

In addition, the copolymer of the present invention comprises about 99.99 to 50% by weight of the anionic polymerization product, e.g., poly(vinyl), poly(diene), or poly(siloxane), as described above, and about 0.001 to 50% by weight of the fluorinated segment. It is believed that because of the surface energies exhibited by the fluorine segment of the copolymer, fluorine segregates to the surface of the copolymer. Accordingly, following the teaching of the present invention, copolymers may be prepared having desirable properties due to the high concentrations of fluorine at the surface thereof despite the use of a small weight percentage of a fluorine component to prepare the copolymer.

The resultant fluorinated copolymers according to the present invention have the following formula:

wherein:

R is poly(vinyl), poly(diene), or poly(siloxane);

$R^1$ and $R^2$ are independently hydrogen, linear or branched lower alkyl C1 to C4, or C6 to C8 aryl;

$R^3$ is linear or branched C1 to C10 or absent; and

Y is C1 to C30 perfluoroalkyl. The molecular weight $M_n$ of the copolymer is from about 500 to 1,000,000.

In another aspect of the invention, the copolymers of the present invention are blended with a second polymer to thereby modify the surface characteristics of the second polymer and provide a polymer composition having desirable characteristics. Such blends can be used, for example, as coatings, packaging materials, pipes, and the like. The second polymer may be a homopolymer comprising the same monomer as the fluorinated copolymer, or may be a polymer comprising different monomer units from the copolymer but which is highly compatible with the copolymer (i.e., sufficiently miscible with the copolymer to form a blend therewith).

For example, a copolymer may be prepared according to the process of the invention having a poly(styrene) component and a perfluorinated terminal segment, i.e., a fluorinated copolymer according to formula (II) wherein R is polystyrene. The copolymer is then blended with a homopolymer such as poly(styrene), or with another polymer with which the fluorinated copolymer is miscible, such as poly(phenylene oxide) and the like. Another exemplary blend may be formed by blending a copolymer according to Formula (II) wherein R is methyl methacrylate with poly(methyl methacrylate), polyvinyl chloride, polyvinylidene fluoride, and the like. Advantageously such blends comprise about 1 to 50% by weight, preferably about 5 to 15% by weight, of the fluorinated copolymer. The blends may be prepared using any of the blending techniques known in the art, including but not limited to the techniques discussed by P. S. Tucker, et al., *Macromolecules* 1988, 21, 2794–2800; L. C. Dickinson, et al., *Macromolecules* 1987, 20, 1757–1760; S. D. Smith, et al., *Polymer Preprints*, 1987, Vol. 28, No. 2, 150–152; T. Hashimoto, et al., *Macromolecules* 1991, 24, 5704–5712; S. Hosoda, et al., *Polymer Journal* 1991, Vol. 23, No. 4, 277–284; and D. Siqueira, et al., *Polymer* 1991, Vol. 32, No. 6, 990–998.

One or more solvents and blends thereof may be used during the anionic polymerization and termination reactions. Illustrative solvents include, but are not limited to, cyclohexane, tetrahydrofuran, and toluene. The polymerization and termination may be carried out at a temperature of about −100 to about 150 C., and is typically carried out at a temperature of about −78° to 100° C.

The following Examples are provided to further illustrate the present invention. In the Examples, Mn means number average molecular weight; Mw means weight average molecular weight; MWD means molecular weight distribution (Mw/Mn); THF means tetrahydrofuran; GPC means gel permeation chromatography; ml means milliliter; psi means pounds per square inch; M means mole; and temperatures are given in degrees celsius. These examples are illustrative of the invention, and should not be considered as limiting thereof.

EXAMPLE 1

Preparation of the Experimental Model

Cyclohexane (Phillips Petroleum) was stirred over concentrated sulfuric acid for ca. two weeks, decanted and distilled under argon from sodium metal. Tetrahydrofuran ("THF") (Fisher, Certified Grade) was distilled under argon from the purple sodium/benzophenone ketyl. Styrene was vacuum distilled from dibutyl magnesium following three freeze-thaw cycles. The chlorosilane, perfluorohexylethyldimethylchlorosilane (Petrarch), was used as received.

EXAMPLE 2

Synthesis of Poly(styrene)-b-Si-ethyl-PTFE

All glassware was rigorously cleaned and dried. The anionic polymerization was conducted in a one-neck 500 mL, round-bottomed flask equipped with a magnetic stir bar and rubber septa under a 6-8 psig argon atmosphere. The flask was charged with 5.50 mL (5.0 g) of styrene in ca. 100 mL of dry cyclohexane. The polymerization was then initiated by the addition of 3.63 mL of a 1.38M solution of sec-butyllithium in cyclohexane. The resulting orange-red solution was then allowed to stir for ca. two hours. After which ca. 2 mL of dry tetrahydrofuran was added to the solution. To functionally terminate the polymerization, 3.31 mL of perfluorohexylethyldimethylchlorosilane (20% excess) was added via syringe and allowed to stir for ca. 30 minutes. During this time, the solution had become cloudy due to the precipitation of lithium chloride. The polymer was precipitated in a ten-fold excess of methanol and washed several times with methanol and water. The polymer was then dried under reduced pressure at 40° C. for twelve hours.

A Waters 150-CV gel permeation chromatograph with Ultrastyragel columns of 500, $10^3$, $10^4$, and $10^5$ Å porosities in tetrahydrofuran using polystyrene standards (Showa Denko) was used for molecular weight determination. Elemental analysis was performed by Galbraith Laboratories, Inc., Knoxville, Tenn.

The success of the termination was confirmed by gel permeation chromatography as evidenced by the shift in molecular weight between the poly(styrene) aliquot and terminated poly(styrene) as shown in Table 1. The weight percent for fluorine in the polymers was then determined by elemental analysis. As shown in Table 2, there was very good agreement with the calculated weight percent.

TABLE 1

| (MW of Silane Fragment = 406 g/mole) | | | |
|---|---|---|---|
| Sample | Target $<Mn>$ | GPC $<Mn>$ | MWD |
| PS-Si-PTFE | 1000 | 1462 | 1.07 |
| PS Aliquot | | 1124 | 1.09 |
| | 5000 | 4760 | 1.05 |
| | | 4337 | 1.06 |
| | 40,000 | 42,954 | 1.08 |
| | | 41,819 | 1.08 |

TABLE 2

| (MW of Silane Fragment = 406 g/mole) | | | |
|---|---|---|---|
| Sample | Target $<Mn>$ | Calculated Wt. % F | Experimental Wt. % F |
| PS-Si-PTFE | 1000 | 17.58 | 16.37 |
| | 5000 | 4.59 | 7.26 |
| | 40,000 | 0.61 | 0.61 |

EXAMPLE 3

Synthesis of Poly(isoprene)-b-Si-ethyl-PTFE

Poly(isoprene)-b-silicon-ethyl-PTFE was prepared following the procedure set forth above, i.e., polymerization of isoprene in cyclohexane, followed by termination of the polymerization by adding perfluorohexylethyldimethylchlorosilane (20% excess) in THF. GPC and elemental analysis was conducted of the resultant copolymer and the results are set forth below in Tables 3 and 4, respectively.

TABLE 3

| (MW of Silane Fragment = 406 g/mole) | | | |
|---|---|---|---|
| Sample | Target $<Mn>$ | GPC $<Mn>$ | MWD |
| PI-Si-PTFE* | 1000 | 1282 | 1.08 |
| PI Aliquot* | | 967 | 1.12 |
| | 5000 | 5153 | 1.06 |
| | | 4684 | 1.06 |
| | 20,000 | 22,276 | 1.07 |
| | | 20,983 | 1.07 |
| | 40,000 | 41,863 | 1.10 |
| | | 39,023 | 1.09 |

*Poly(isoprene) molecular weight normalized from poly(styrene) standards.

TABLE 4

| (MW of Silane Fragment = 406 g/mole) | | | |
|---|---|---|---|
| Sample | Target $<Mn>$ | Calculated Wt. % F | Experimental Wt. % F |
| PI-Si-PTFE | 1000 | 17.58 | 14.30 |
| | 5000 | 4.53 | 3.99 |
| | 20,000 | 1.21 | 0.88 |
| | 40,000 | 0.61 | 0.11 |

EXAMPLE 4

Synthesis of Poly(butadiene)-b-Si-ethyl-PTFE

Poly(butadiene)-b-Si-ethyl-PTFE was prepared following the same procedures described in Examples 3 and 4, except that the polymerization was conducted using toluene as a solvent at −10° C. The results of GPC and elemental analysis of the resultant copolymer is set forth below in Tables 5 and 6, respectively.

TABLE 5

| (MW of Silane Fragment = 406 g/mole) | | | |
|---|---|---|---|
| Sample | Target $<Mn>$ | GPC $<Mn>$ | MWD |
| PBD-Si-PTFE* | 1000 | 1223 | 1.08 |
| PBD Aliquot* | | 925 | 1.11 |
| | 5000 | 5326 | 1.18 |
| | | 5134 | 1.18 |

*Poly(butadiene) molecular weight normalized from poly(styrene) standards.

TABLE 6

| (MW of Silane Fragment = 406 g/mole) | | | |
|---|---|---|---|
| Sample | Target $<Mn>$ | Calculated Wt. % F | Experimental Wt. % F |
| PBD-Si-PTFE | 1000 | 17.58 | 16.86 |
| | 5000 | 4.53 | 1.81 |

EXAMPLE 5

Synthesis of Poly(dimethylsiloxane)-b-Si-ethyl-PTFE

Again polymerization was conducted using the procedures described above for a hexamethylcyclotrisiloxane monomer using cyclohexane and tetrahydrofuran (THF) as a polymerization solvent. The results of elemental analysis of the resultant copolymer are set forth below in Table 7.

TABLE 7

| (MW of Silane Fragment = 406 g/mole) | | | |
|---|---|---|---|
| Sample | Target $<Mn>$ | Calculated Wt. % F | Experimental Wt. % F |
| PDMS-Si-PTFE | 1000 | 17.58 | 21.93 |
| | 5000 | 3.83 | 6.09 |

TABLE 7-continued (MW of Silane Fragment = 406 g/mole)

| Sample | Target <Mn> | Calculated Wt. % F | Experimental Wt. % F |
|---|---|---|---|
|  | 40,000 | 0.60 | 1.97 |

*Elemental analysis performed by Galbraith Laboratories; Knoxville, TN.

EXAMPLE 6

Preparation of Poly (styrene)-b-Si-ethyl-PTFE and Poly (2,6-dimethylphenylene oxide) Blend A 50% by weight blend of poly(styrene)-b-Si-ethyl-PTFE ("PS-Si-PTFE") and poly(2,6-dimethylphenylene oxide) ("PPO") was prepared by dissolving 0.4980 grams PPO (light yellow cream colored powder) and 0.4992 grams PS-Si-PTFE (white powder) in chloroform (Mallinckrodt, HPLC grade) and stirring for one hour. The clear, pale yellow solution was precipitated in 600 mL methanol, then dried at reduced pressure for 12 hours. The solution was then filtered and the blend was recovered as a light yellow cream-colored powder. XPS verified the success of the blend.

In the specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A copolymer having a fluorinated terminal segment thereon comprising a compound according to the formula:

(II)

wherein:
  R is selected from the group consisting of poly(vinyl, and poly(diene);
  $R^1$ and $R^2$ are independently hydrogen, linear or branched C1 to C4 alkyl, or C6 to C8 aryl;
  $R^3$ is linear or branched C1 to C10 alkylene or is a direct bond; and
  Y is C1 to C30 perfluoroalkyl.

2. The copolymer according to claim 1 wherein said poly(vinyl) is selected from the group consisting of poly(styrene), poly(methyl methacrylate), poly(acrylonitrile), and poly(2-vinyl pyridine).

3. The copolymer according to claim 1 wherein said poly(diene) is poly(isoprene) or poly(butadiene).

4. The copolymer according to claim 1 wherein:
  $R^1$ and $R^2$ are each methyl;
  $R^3$ is ethylene; and
  Y is perfluorohexyl.

5. The copolymer according to claim 1 further comprising a second polymer which is sufficiently miscible with said copolymer to form a polymer blend therewith.

6. The copolymer to claim 1 wherein
  R is selected from the group consisting of poly(styrene), poly(methyl methacrylate), poly(acrylonitrile), and poly(2-vinyl pyridine);
  $R^1$ and $R^2$ are each methyl;
  $R^3$ is ethylene; and
  Y is perfluorohexyl.

7. The copolymer according to claim 1 wherein:
  R is poly(isoprene) or poly(butadiene);
  $R^1$ and $R^2$ are each methyl;
  $R^3$ is ethylene; and
  Y is perfluorohexyl.

8. A copolymer having a fluorinated terminal segment thereon comprising a compound according to the formula:

(I)

wherein:
  R is poly(vinyl);
  $R^1$ and $R^2$ are independently hydrogen, linear or branched C1 to C4 alkyl, or C6 to C8 aryl;
  $R^3$ is linear or branched C1 to C10 alkylene or is a direct bond; and
  Y is C1 to C30 perfluoroalkyl.

9. The copolymer according to claim 8 wherein said poly(vinyl) is selected from the group consisting poly(styrene), poly(methyl methacrylate), poly(acrylonitrile), and poly(2-vinyl pyridine).

10. The copolymer according to claim 8 wherein:
  $R^1$ and $R^2$ are each methyl;
  $R^3$ is ethylene; and
  Y is perfluorohexyl.

11. The copolymer according to claim 8 wherein:
  R is selected from the group consisting poly(styrene), poly(methyl methacrylate), poly(acrylonitrile), and poly(2-vinyl pyridine);
  $R^1$ and $R^2$ are each methyl;
  $R^3$ is ethylene; and
  Y is perfluorohexyl.

12. A copolymer having a fluorinated terminal segment thereon comprising a compound according to the formula:

(I)

wherein:
  R is poly(diene);
  $R^1$ and $R^2$ are independently hydrogen, linear or branched C1 to C4 alkyl, or C6 to C8 aryl;
  $R^3$ is linear or branched C1 to C10 alkylene or is a direct bond; and
  Y is C1 to C30 perfluoroalkyl.

13. The copolymer according to claim 12 wherein said poly(diene) is poly(isoprene) or poly(butadiene).

14. The copolymer according to claim 12 wherein:
  $R^1$ and $R^2$ are each methyl;
  $R^3$ is ethylene; and
  Y is perfluorohexyl.

15. The copolymer according to claim 12 wherein:
  R is poly(isoprene) or poly(butadiene);
  $R^1$ and $R^2$ are each methyl;
  $R^3$ is ethylene; and
  Y is perfluorohexyl.

* * * * *